A. H. BRAECKLEIN.
MACHINE FOR SEALING BOTTLES.
APPLICATION FILED FEB. 3, 1917.

1,245,561.

Patented Nov. 6, 1917.
8 SHEETS—SHEET 1.

Fig.1.

Witnesses
Porter H. Flautt
Alice J. Donegan

Inventor
Alfred H. Braecklein
By Edward R. Samuels
Attorney

Fig.2.

A. H. BRAECKLEIN.
MACHINE FOR SEALING BOTTLES.
APPLICATION FILED FEB. 3, 1917.

1,245,561.

Patented Nov. 6, 1917.
8 SHEETS—SHEET 3.

Witnesses
Porter H. Hault
Alice G. Honegan

Inventor
Alfred H. Braecklein
By Edwin Sammels
Attorney

A. H. BRAECKLEIN.
MACHINE FOR SEALING BOTTLES.
APPLICATION FILED FEB. 3, 1917.

1,245,561.

Patented Nov. 6, 1917.
8 SHEETS—SHEET 5.

UNITED STATES PATENT OFFICE.

ALFRED H. BRAECKLEIN, OF BALTIMORE, MARYLAND, ASSIGNOR TO THE SANITARY SEAL MANUFACTURING COMPANY, OF BALTIMORE, MARYLAND, A CORPORATION OF MARYLAND.

MACHINE FOR SEALING BOTTLES.

1,245,561.   Specification of Letters Patent.   Patented Nov. 6, 1917.

Application filed February 3, 1917. Serial No. 146,324.

*To all whom it may concern:*

Be it known that I, ALFRED H. BRAECKLEIN, a citizen of the United States of America, and resident of the city of Baltimore, State of Maryland, have invented certain new and useful Improvements in Machines for Sealing Bottles, of which the following is a specification.

This invention relates to a machine for applying bottle seals or wrappers of the general type of those described in my U. S. Patent No. 1,145,666, to the bottles for which they are prepared.

The seals as described in the above-recited patent, are each in the form of a bag or envelop, open at one end and preferably having a flap or extension at the side of the opening. The seals in the preferred form are more specifically described in my application Serial No. 103,577.

The machine, broadly considered, consists in a hopper or other means for supplying seals, means for advancing the seals one at a time, means for bringing the bottles successively to a predetermined station, and means for engaging the seals one at a time and drawing them down over the bottle at the aforementioned station.

In the machine shown herein, the seals are drawn down over the bottle from the top and folded to close the opening of the bag and cover the bottom of the bottle. At the first station, the seal is applied to the bottle; the bottle with the open seal thereon is then carried to other stations where the edges of the opening are preferably coated with adhesive, folded, pressed and fastened. In the form of the invention shown, the bottles are introduced into and removed from the machine by means of suitable belt conveyers.

The present machine moves the bottles in a fixed path with a step by step motion, the dwells being at fixed points or stations. In the form in which it is shown, there is a rotating head with a plurality of gripper arms. The head rotates intermittently and moves up and down between the rotated steps, and the grippers are opened and closed at suitable intervals while the rotary head is stationary to receive the bottles, to permit the seals to be drawn over them, and to release them for delivery. Each set of grippers in turn receives a bottle from the feed mechanism, grips it and carries it forward to a suitable support where it is released and the seal drawn over it. It is then picked up again and carried forward to the several stations in the path of the rotary grippers where it is successively treated in the manner already outlined and at the end of the operation placed on a suitable conveyer by which it is carried out of the machine completely sealed.

The machine in connection with which the present invention has been developed and reduced to practice is illustrated in the accompanying drawings, in which.

Fig. 7' is a detail view;

Referring to the drawings by numerals each of which is used to indicate the same or equivalent parts in the different figures, the construction and operation of the machine is as follows:—

Figure 1:
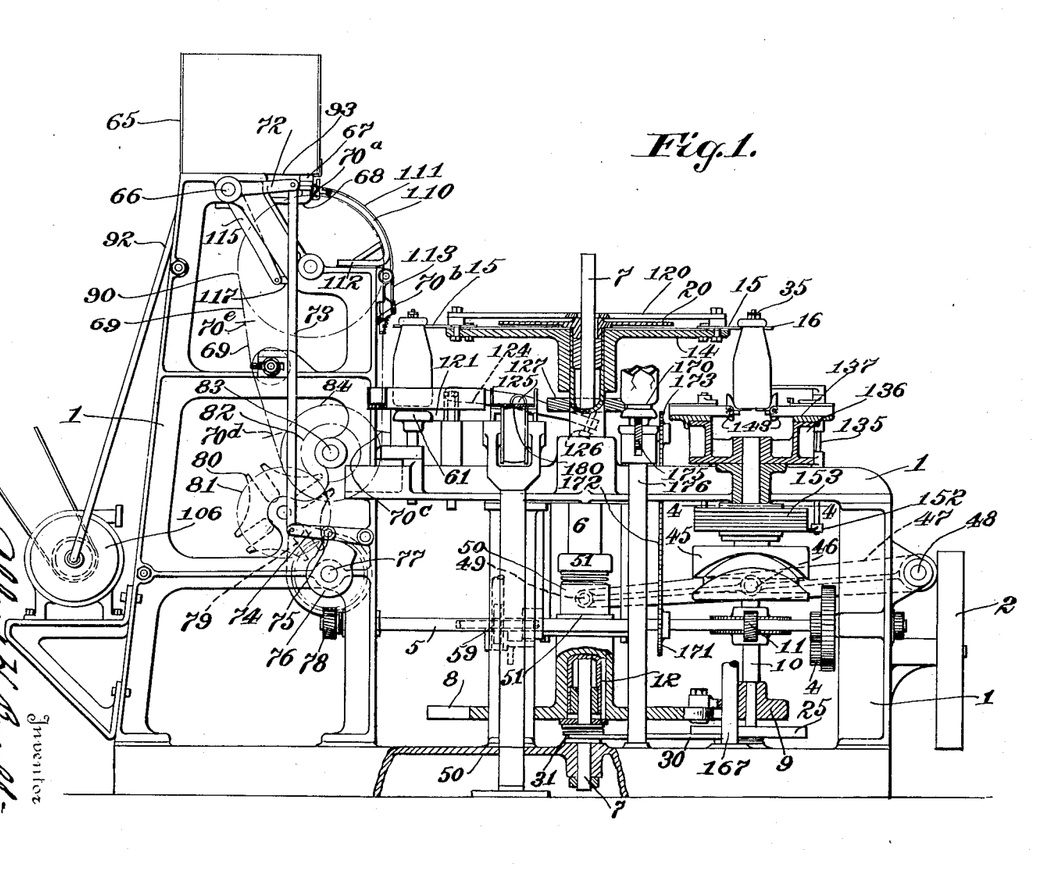
Figure 1 is a side elevation, certain parts being cut away and shown in section for convenient illustration.

There is a rigid frame 1 made up of castings designed to support the various elements of the machine. At the right end of the frame, as seen in Fig. 1, there is a drive pulley 2 or the machine may be driven from any other suitable source of power. The pulley 2 drives a horizontal shaft 5 known as the main shaft, the connection being through a suitable train of gears 4. Near the center of the machine there is an upright shaft 6 mounted to rotate in suitable bearings on the frame. In the form of the machine shown, this shaft is hollow and contains within the hollow a second shaft 7 also mounted in suitable bearings on the machine and capable of rotation independently of the shaft 6. Mounted on the lower end of the hollow shaft 6 and connected thereto to rotate therewith by means of a key 12 so as to permit relative motion of the parts in the direction of the axis of the shaft, there is a star wheel 8 engaged and driven intermittently by the star wheel crank 9 on the vertical shaft 10 mounted in suitable bearings in the machine frame and driven by spiral gears 11 from the drive shaft 5. In the form of the invention shown, the parts are so related that the shaft 6 and the star wheel 8 make one rotative step for each complete sealing operation. It is apparent that the hollow shaft 6 will thus be given an intermittent rotary motion. The hollow shaft 6 carries at its upper end secured thereto, the intermittently revolving gripper head 14 supplied with a number of sets of grippers 15, preferably corresponding to the number of the arms of the star wheel 8. The gripper head and gripper arms are shown in plan in Fig. 2. Each set of grippers 15 consists of two jaw members 16, pivotally mounted on the gripper head and geared together by intermeshing toothed segments 17 on the hub of each gripper arm. The gripper arms extend outward radially from the pivots and one gripper arm of each set is provided with a tail 18 which is preferably inclined backward as to the direction of rotation, giving a bell crank effect, and at the end of the tail 18 or follower arm, as it may be termed, is a follower 19 engaging a cam 20 which is keyed to the inner shaft 7.

Figures 9, 10, 11:
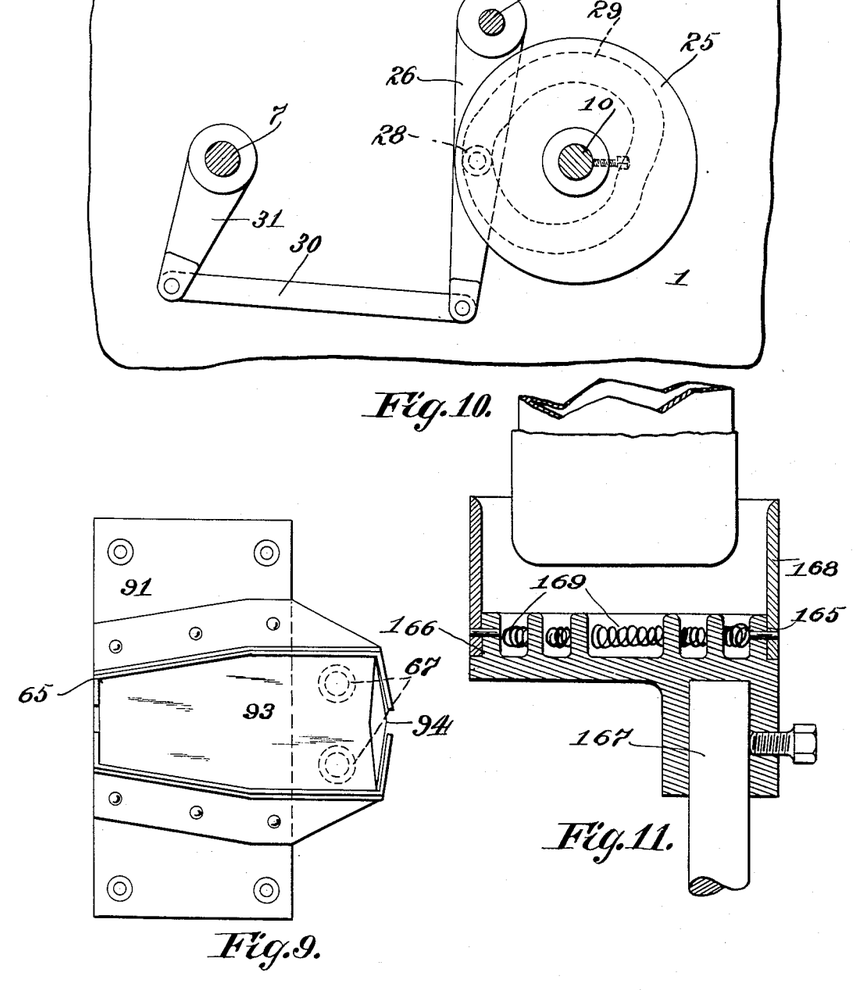
Fig. 9 is a plan view of the hopper with a supply of seals in place.
Fig. 10 is a plan view of the mechanism for oscillating the gripper cam.
Fig. 11 is a vertical section showing the reheating device used in the treatment of the adhesive material on the skirt.
Figure 12:
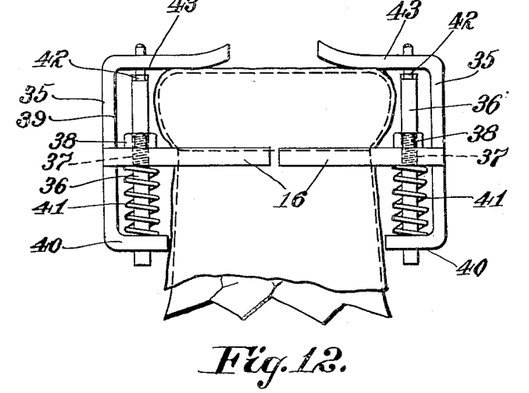
Fig. 12 is a view of the corner folding or flattening fingers forming part of each bottle gripper.
Figure 13:
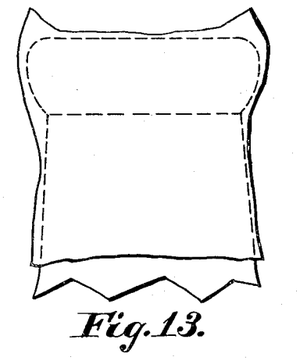
Fig. 13 shows a bottle neck with the top portion of the seal before the corners are folded.
Figure 14:
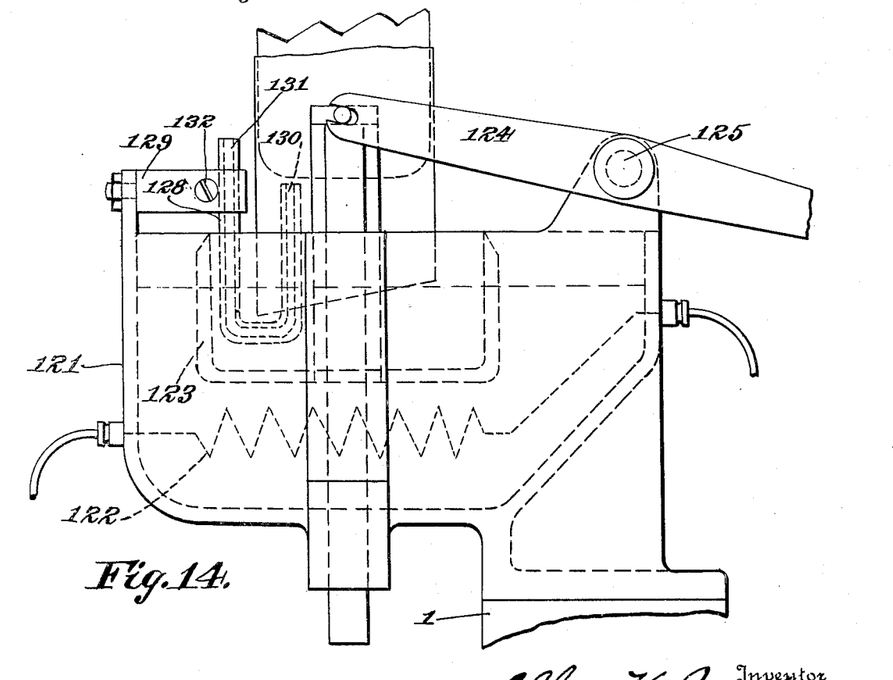
Fig. 14 is an elevation showing the pot or receptacle containing liquid adhesive with the dipper and dipper actuating lever.

As has already been pointed out, the grippers engage and disengage when the gripper head is stationary so that while the gripper head in fact rotates relatively to the cam 20 causing the followers 19 to rub the face of the cam, the effective operation of the grippers which takes place while the head is stationary is caused by oscillating the cam 20 during the period of rest of the gripper head. The rotation of the gripper head brings each particular cam follower in turn to a position on the cam immediately in the vicinity of the "operative" part of the cam 20 and then a slight oscillation of the cam brings the followers into contact with the incline of the cam, swinging the gripper arms and giving the desired opening or closing motion. The oscillations of the shaft 7 and the cam 20 are produced by means of a cam and lever movement illustrated in detail in Fig. 10. It consists of a path cam 25 on the lower end of the shaft 10, a swinging follower arm 26 pivoted at 27 on the machine frame carrying a follower 28 which engages a suitable path 29 in the cam. The follower 28 is placed intermediately of the lever 26, the swinging end of the same being connected by a suitable rod 30 with the swinging end of a crank 31 on the shaft 7. It will be apparent that the rotary motion of the shaft 10 is thus transformed by the cam and lever mechanism to an oscillatory motion of the shaft 7, the same being timed and determined by the configuration and setting of the cam 25.

At certain periods of the operation, it is necessary that the bottle be raised and lowered and this is accomplished in the present instance by raising and lowering the entire hollow shaft 6 of the gripper head, in the present machine during each dwell between the rotative steps. To this end, there is a cam 45 mounted on the vertical shaft 10. The follower 46 which engages this cam is carried intermediately on a swinging lever 47 pivoted on the machine frame at 48. This lever is provided with jaws 49 at the swinging end which engage the sleeve 50 on the shaft 6 between the thrust collars 51 thereon. The rotation of the cam oscillates the lever 47 and raises and lowers the shaft 6, the gripper head 14, the grippers and the bottles carried thereby. In the present instance, the head is moved up and then down between each rotative step.

The grippers 16 and 17 are of a configuration to fit and inclose the neck of a bottle and each gripper as shown in the present instance is provided with spring fingers 35 to flatten the top of the seal over the mouth of the bottle. These spring fingers in the present instance consist each of a mechanism as follows:—Each gripper arm is pierced at the center of the arm to receive a vertical stud 36 which is secured by any suitable means as a thread 37 in the gripper arm and lock nut 38. Each stud carries a plate 39 bent in the form of a U placed with its legs horizontal. The bottom leg 40 is bored to receive the bottom end of the stud with a sliding fit. A spiral spring 41 incloses the stud beneath the gripper arm bearing at its top end against the bottom surface of the gripper and at its bottom end against the top of the bottom leg 40 of the U-shaped plate. At its upper end, the stud is shouldered and reduced at 42 and the top leg 43 of the U, which is elongated, is adapted to receive the reduced portion of the stud, the shoulder acting as a stop, and the reduced portion acts as a guide. The outer or free end of the top leg 43 of the U, which is in fact the folding or smoothing finger, is preferably turned up as shown. As each bottle is gripped, the fingers are passed with a yielding pressure over the top of the bottle, and particularly in the gripper operation, after the bottle has been inclosed in the seal, they engage and fold down the corners of the seal.

The mechanism for presenting the bottles and accomplishing the various operations essential to the application of the seal and finally for discharging the bottles from the machine, will now be described in the order of operation.

Figure 2:
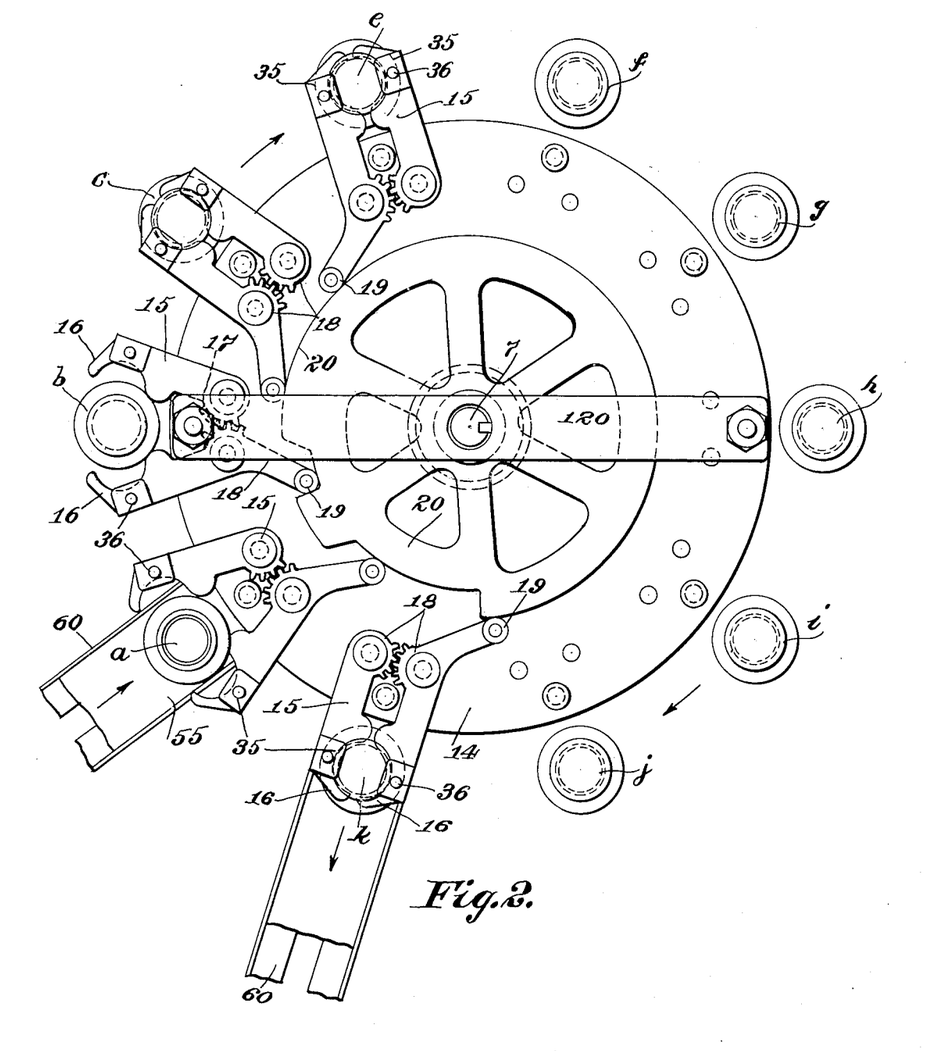
Fig. 2 is a plan of the rotating gripper mechanism.
Figure 3:
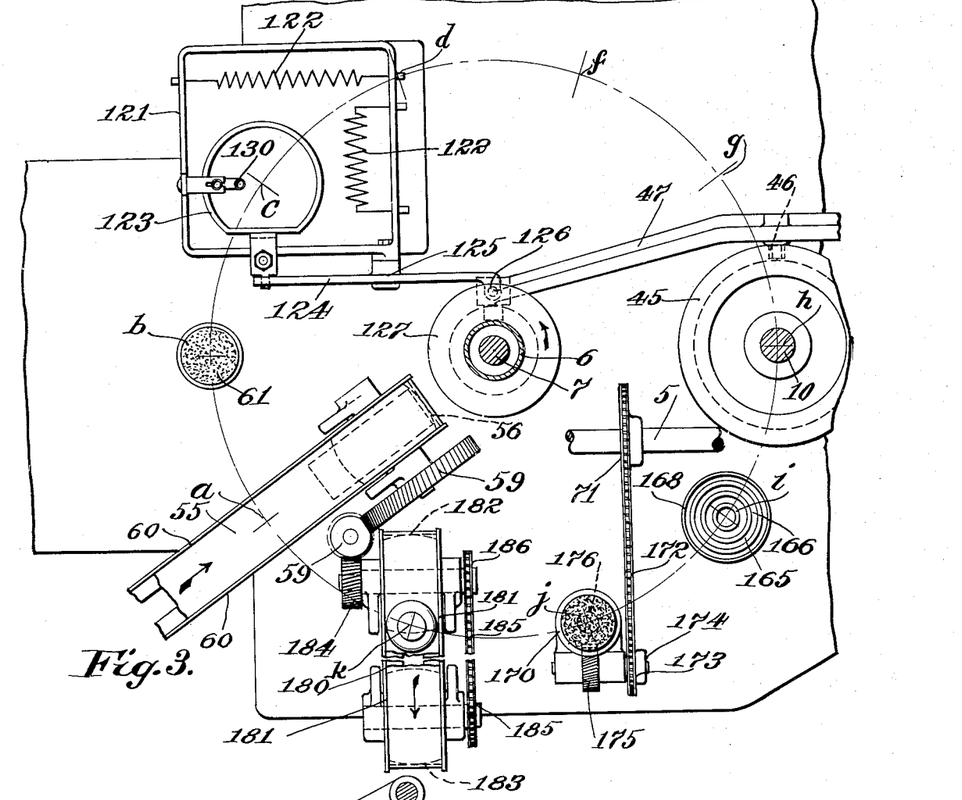
Fig. 3 is a plan showing the feed, the sealing support, and other stations (this view is of a partially diagrammatic nature)

The bottles are presented to the grippers at station $a$, see Figs. 2 and 3, by means of a conveyer belt 55 to which motion is imparted by a pulley 56 driven by spiral gears 59 from the main shaft 5 or in any other suitable manner. The bottles are held on the belt by guides 60 until taken up by the grippers.

From station $a$, the bottles are carried to station $b$ and deposited on the support or table 61 where each bottle in turn remains until the corresponding seal is drawn over it as described.

In the machine illustrated, seals are supplied from a hopper 65 in which they are placed in a pack, suitable means being provided to separate them from the pack one at a time, carry them forward and apply each seal to a bottle. As embodied in the present machine, this means consists of a rock shaft 66 carrying vacuum gripper nozzles 67 and tripping finger 68 together with the intermittently operating gripper chain 69 carrying grippers 70-a-b-c-d-e. The rock shaft 66 is operated by an arm 72 secured thereto, a connecting rod 73, and cam arm 74 joined at its swinging end by the connecting rod 73 to the swinging end of the arm 72, the cam arm 74 being pivotally mounted on the machine frame and carrying intermediately of its length a follower 75 which engages a cam 76 on a shaft 77 driven by spiral gearing 78 from the main shaft 5. The shaft 77 also carries Geneva crank 79 which meshes with a Geneva star wheel 80 carrying a toothed gear 81 which in turn meshes with a gear 82 on a shaft 83 which in turn carries a sprocket 84 over which drives gripper chain 69, the chain being guided beneath the hopper by a large idler sprocket 90. As will be noted from the plan view, Fig. 9, of the hopper, the seals are exposed beneath for a considerable portion of their length, the bottom plate 91 of the hopper being much narrower than the length of the hopper for this purpose. The hopper is shaped to receive the seals with their open ends turned to the right and the open portion 93 of the hopper is at the right end as seen in Fig. 1. It is also well to note that as shown the seals are placed in the hopper with the tabs down. The vacuum grippers are controlled by a tube 92 which leads to an exhaust pump or blower 106.

The oscillation of the rock shaft 66 causes the vacuum gripper nozzles 67 which are secured thereto as radial arms to move up and down in a path beneath the opening 93 at the forward end of the hopper and in their upper position, they engage the bottom surface of the bottom seal near the edge of the opening at the end of the seal. As the grippers move downward, they cause the end of the seal to be bent and swung downward bringing the tab 94 into the jaws of the gripper 70$^a$ which is caused to dwell in position to receive the seal tab by the intermittent motion of the chain 69.

Figure 7:
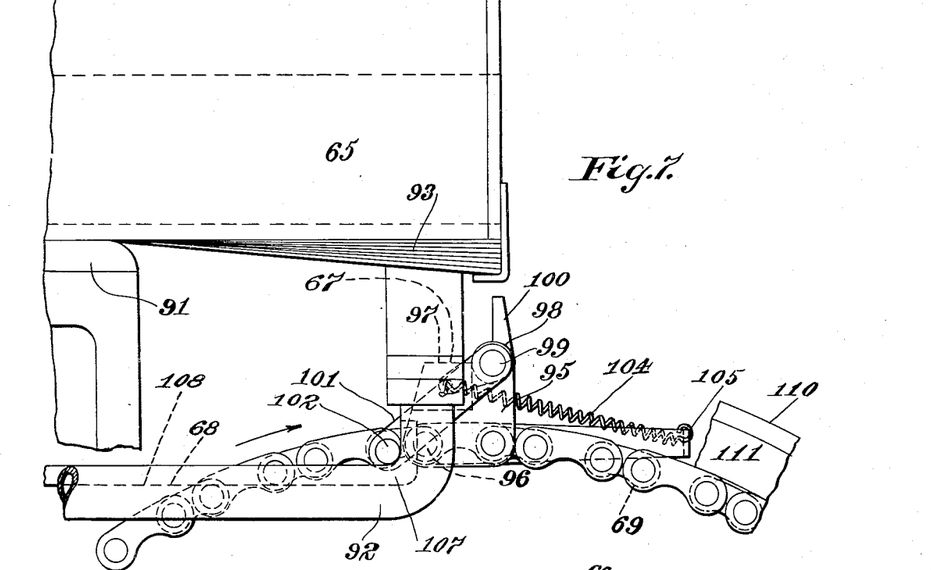
Fig. 7 is a fragmentary elevation of the hopper showing a single gripper and the gripper chain.
Figures 7, 8:
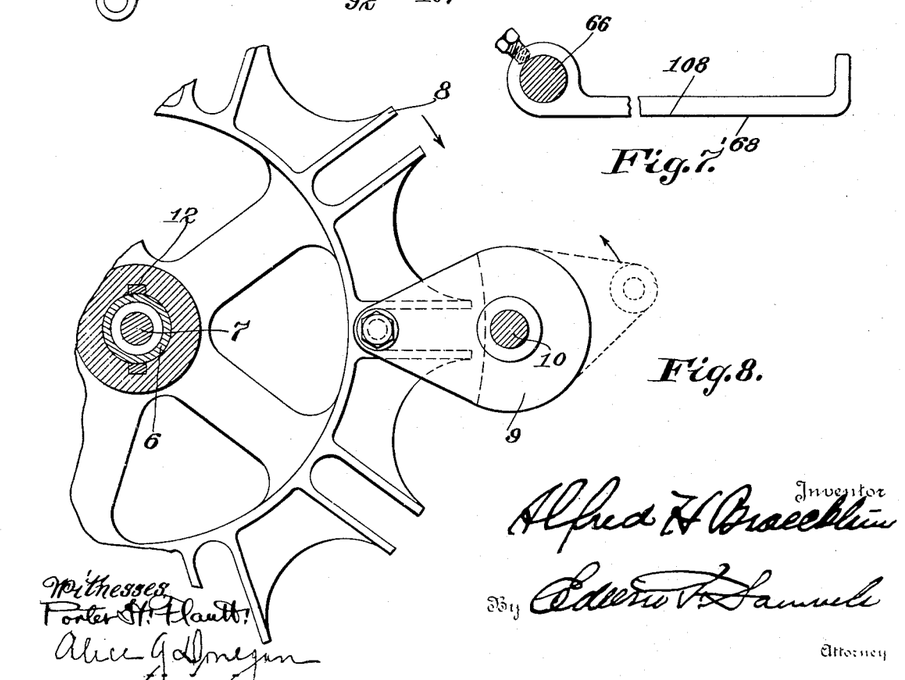
Fig. 8 is a fragmentary elevation of the star wheel and crank which operates the rotating gripper mechanism.

The grippers include each a block 95 straddling the chain and held by elongated link pins 96. The top of the block which, as shown in Fig. 7, extends upward from the chain to a considerable degree, is provided at the rear with a gripping surface 97 and at the forward end with a bearing 98 in which is mounted a pin 99 having secured thereto a swinging jaw 100 adapted to coöperate with the gripper surface 97 which pin also carries at one end an elongated swinging arm 101 provided at its extremity with a tripping stud 102 and at its other end with a radial arm 103 engaged at its swinging extremity by a tension spring 104 which is secured at its opposite end to a forwardly projecting bracket 105 carried by the block 95. The arm 103 projects from the journal 99 in a direction substantially opposite to the jaw 100 so that the spring 104 engaging the end of the arm 103 tends to close the gripper by pressing the jaw 100 against the gripper surface 97 and maintain it normally closed.

Figures 15, 16, 17, 18:
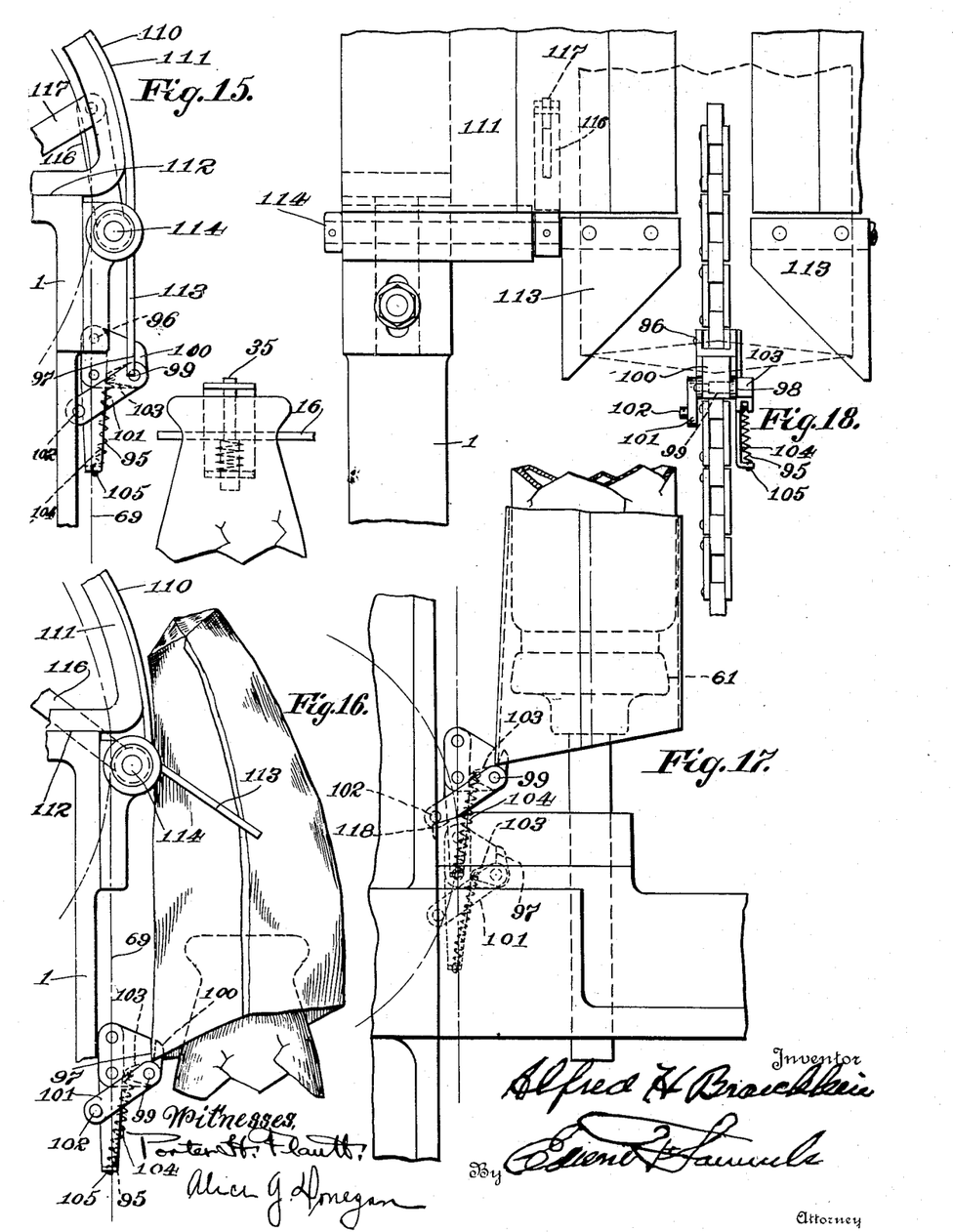
Fig. 15 is a fragmentary elevation of the gripper chain, guides, etc., with the neck of a bottle in operative relation thereto.
Fig. 16 shows the same parts with a bottle seal duly opened and partially drawn over the neck of the bottle, the grippers, etc., being in a corresponding position.
Fig. 17 shows the same parts with the seal drawn well down over the bottle.
Fig. 18 is a view taken at right angles to Figs. 15, 16 and 17 showing the opener blades which act on the seals just before they are drawn on the bottle.

In addition to the nozzle 67, the rock shaft 66 carries a latch or hook 107 having an elongated shank 108 projecting in a substantially horizontal direction from the shaft. As each gripper passes beneath the opening in the bottom of the hopper, the traverse being in the direction of the arrow shown in Fig. 7, the stud 102 on the end of the arm 101 is caught by the hook 107 which is being swung upward by the oscillation of the shaft 66 and opens the gripper holding it open until the end of the tab of the particular seal being handled, being drawn down by the vacuum nozzles which move down on the other swing of the shaft 66, enters between the gripper jaws 97 and 100, the rocking of the shaft 66 which brings the nozzles down and the end of the seal downward into the gripper also serving to swing the hook downward and release the stud 102 permitting the grippers to close. The forward traverse of the chain carries the seals, open end first, downward and forward along the 90° arc 110 of the gear 90, the seal passing over the arcuate guides 111 supported on the frame at 112, the gripper block passing between the guides. As the seal passes into the vertical traverse of the chain just above the bottle which is in position on the support 61 immediately forward of the path of the grippers and comes to rest, it is engaged by the triangular openers 113. These are secured to a horizontal shaft 114 journaled in the machine frame just beneath the guides 111. These openers are operated by means of a crank 115 depending from the rock shaft 66 and the crank 116 extending upward from the shaft 114, the swinging ends of the two cranks being connected by a connecting rod 117. The openers presenting their inclined edges inwardly, engage the seal, swinging upward and forward toward the horizontal position which treatment causes the seal to balloon substantially as shown in Fig. 16. As the seal is opened and again moves downward, the mouth of the seal incloses the top of the bottle and the seal is drawn downward over the bottle passing through the positions shown in Figs. 16 and 17. As each gripper in its traverse reaches the upper one of the two positions shown in Fig. 17, the stud 102 is engaged by a suitable cam or dog 118 which swings the arm 101 upward, opening the gripper and releasing the seal, after which the curve or obliquity of the arc swung by the stud 102 about the journal 99 causes the stud to pass over the vertical edge of the cam 118 so that the gripper is free to continue its traverse, the seal having been drawn downwardly until its top engages the top of the bottle and the skirt projects downward over the support as shown.

The operation at station *b* having thus been completed, the next step is to remove the bottle to the station where the next operation takes place. The cam 20 is therefore slightly oscillated by the cam motion 25, 26, 27, 28, 29, 30, causing the bottle grippers 16 and 17 to close. By the closing of the grippers, the bottle is grasped at the neck portion and at the same time the upper corners of the seal are flattened by the operation of the folder fingers 43. In order to release the bottle from the support which we have noted is inclosed by the skirt of the seal, it is necessary first to raise it and to this end, the cam mechanism 45, 46, 47, 48, 49, etc., operates, raising the shaft 6, the gripper head 14 and all the grippers, also including the cam 20 and the keeper 120, the function of which will be described. As the skirt of the seal clears the support 61, the gripper head rotates one step, bringing the bottle with the seal thereon to station *c*, where the receptacle carrying the adhesive material is located.

This material may be of any convenient nature. In the present instance, paraffin is used. A supply of this wax is kept in the receptacle 121 and in order that it may be in the liquid state and always ready for application, it is treated by any suitable heating means as the electric coils 122. In order that the liquid may be applied to each partially sealed bottle to a constant predetermined level, means has been provided in the present instance for dipping up a supply of the liquid adhesive as each bottle comes to this station. By this mechanism, the dipper after being filled is moved upward to a fixed height to meet and receive the bottle, or more particularly the depending skirt of the seal. The mechanism consists of a dipper 123 mounted on a swinging lever 124 pivoted intermediately at 125 on the receptacle 121 or other suitable stationary support. The lever 124 carries the dipper 123 at one end and at the other end a follower or, more properly, an adjustable contact 126 which engages a disk or horizontal stop 127 carried by the hollow shaft 6. The operation is not properly termed a cam action.

The upward motion of the bottle gripper parts has already been described. The bottle is now suspended over the dipper 123. The motion of the cam 45 permits the gripper head with the grippers and the bottle with the seal approaching station *c* to be dropped when directly over the dipper. The descent of the hollow shaft 6 carrying the disk 127 presses the latter against the follower or contact point 126 swinging that end of the lever 124 downward and raising the dipper so that the skirt of the seal not only passes downward into the dipper but the dipper comes up to meet and receive the skirt. It is therefore apparent that if the receptacle 121 is kept sufficiently full of liquid to permit the dipper 123 to be submerged so that it will be filled at each stroke, the parts of the machine bearing uniform relation to each other will cause the adhesive to be applied to the seal up to a uniform level in each instance.

To facilitate dipping I provide a vent 128 consisting of a U-shaped tube supported on a clamp 129 secured to the side of the receptacle 121 through which the air beneath the skirt escapes. As shown, one leg of the U 130 is held in the clamp by means of screw 132, the other leg extending up inside the skirt beneath the bottle, the loop of the U serving to encircle the lower edge of the skirt permitting it to hang free. It is apparent that the vent may be adjusted by sliding the leg 131 up and down through the clamp and that the formation of the U permits the skirt to extend downward into the liquid while the leg or nozzle 130 extends upward inside the skirt, the air impounded beneath the skirt passing through the tube as the skirt descends into the paste.

The next four steps of the rotation of the gripper head with the dwell of the bottle at each station, $e$, $f$, and $g$, are taken up with the drying of the adhesive, and in the form of the machine shown, there is no mechanism at either one of these stations.

Figure 4:
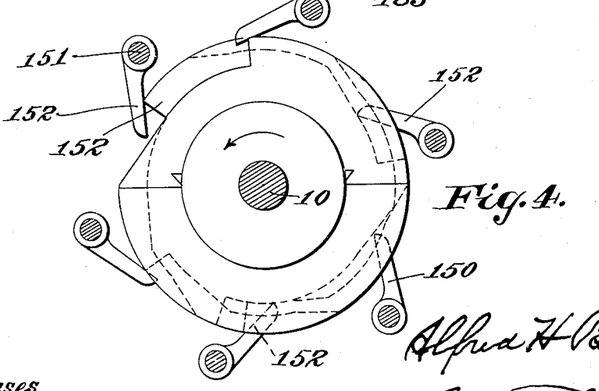
Fig. 4 is a sectional plan on the line 4, 4 of Fig. 1 showing the cams and pawls for actuating the folding or tucking mechanism.

At the next station, $h$, the tucking operation is performed and the tucking apparatus will now be described. This is shown in plan in Fig. 5, in central vertical section in Fig. 6 and similarly in Fig. 1, the tucking apparatus being indicated in a general way by reference character 135. Mounted on the frame and in line with the center of the vertical cam shaft 10, is a head 136, the top of which is in the form of a ring 137. This is provided in the present instance with six sets of radial guides 138 in each of which is a sliding bar 139. Each of the sliding bars is forked at its inner extremity and provided with a folder 140 mounted in the slot 141 of the fork on a transverse pin 142. Each of the folders is provided with a fin 143 which extends backward into a reduced portion of the slot 141 to be engaged by a friction plug 145 mounted in a transverse opening 146. The device consists, see Fig. 5, of a plug proper hollowed out at 146 to receive a spiral spring 147 which bears on the bottom of the opening. When the fin is inserted, the plug is depressed against the tension of the spring and when released, the plug bears against the fin setting up sufficient friction to cause the folder to remain in whatever position it reaches by the operation of the parts until it encounters some fixed resistance as in meeting the stop 148 on the corresponding guide. The slides or sliding rods 139 are operated each by a forked lever arm 149, one for each slide, the fork of the lever arm engaging a pin 150 on the slide. Each arm 149 is mounted on an upright shaft 151 set off at one side. Each of these upright shafts is provided at its lower end, see Fig. 4, with a radial follower finger 152 engaging a cam 153. In the form of the invention shown, there is a series of cams 153, see Fig. 1, mounted on the same shaft 10 one over the other so that the upright shafts 151 are of different lengths to bring the respective followers thereon into contact each with the particular cam with which it must coöperate. In addition to the parts thus described, each of two of the shafts 151, see 151$^a$ and 151$^b$, is provided with a positioning finger 155, the end 156 of which is slightly curved, and swings through a tangent to the surface of the bottle.

Figures 5, 6:
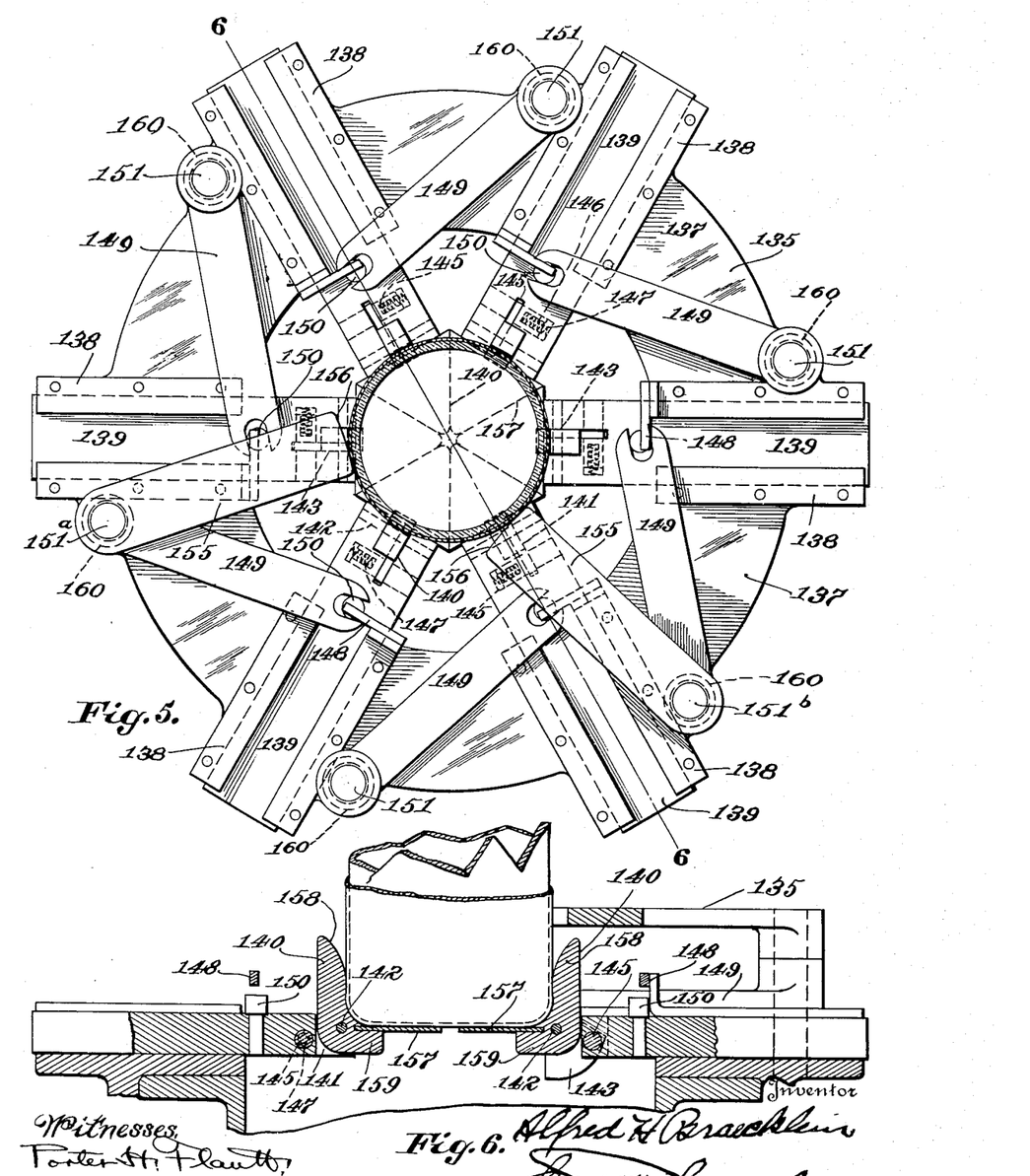
Fig. 5 is a plan of the tucking mechanism.
Fig. 6 is a vertical central section on the line 6, 6 of Fig. 5.

The folders are shown in vertical section in Fig. 6. Each may be said to be comprised of two fingers, one vertical or cam finger 158, the other horizontal, 159. The latter is in each instance provided with a folder plate 157 in the form of an equilateral triangle secured at its base to the horizontal finger and having its vertex disposed toward the center of the tucking ring.

When in the rotation of the gripper head, the bottle, the sealing of which is being discussed, arrives over station $h$, it is lowered into position concentric with the tucking ring and to a level illustrated in Fig. 6. The cam is so timed that the slides move inward in order of right-handed rotation until the last two are reached. These, in the preferred form, operate simultaneously. The curve of the upper portion of the inner or forward surface of each vertical tucking finger 158 will be noted. This curve comes first in contact with the cylindrical surface of the bottle and in this connection has something of a cam action whereby the tuckers are rotated in a vertical plane until they reach the position illustrated in Fig. 6, causing the triangular tucking fingers 157 to be pressed successively in rotation as described against the bottom of the bottle, turning up or tucking a corresponding portion of the skirt. When the slides have all reached the innermost position illustrated in plan in Fig. 5, the tucking is completed and the bottle is withdrawn by the lifting of the gripper head as already described. Following this, each sliding rod is withdrawn by the action of the spiral springs 160, one of which encircles each of the vertical shafts 151 giving it a tendency to rotate and withdraw the slide against the action of the cam. As the slides are withdrawn, the tuckers 140 are brought each into contact with the stops 148 swinging them forward into position with the fingers at approximately 45° to the vertical so that they are each ready for operation on the next advancement of the slide by which they are carried.

From the tucking station, each bottle with the seal thereon having the skirt coated with adhesive and tucked, is carried to the heater at station *i* and lowered vertically as at each of the other stations. The heater indicated by reference character 165, see Fig. 11, consists of a corrugated support 166, shown as mounted on an upright 167 on the frame. The support 166 may be provided with a rim 168 as shown. This corrugated support 166, in order that it may serve the function of a heating means, is provided with heating coils 169. It is of course apparent that the heating unit may be varied to suit the variety of heating means as electricity, gas or oil, which happens to be most easily available.

The bottle with the skirt duly creased and tucked as described having been inserted in the heater 165 and held there during one interval of the operation of the gripper head, the adhesive is softened so that the folds are held or partially held in position. As the head rises, the bottom is lifted from the heater and carried forward to station *j* where it is placed on a rotary support 170. This support 170 is covered with rubber or equivalent material as illustrated in Fig. 3 and in the present instance is driven by gearing consisting of a sprocket 171 on the main shaft, chain 172, and sprocket 173 on a short shaft 174 mounted in a bracket on the frame. The short shaft 174 carries one member of spiral gearing 175, the other member being on a vertical shaft 176 which carries the support 170. In this way rotation is imparted to the support. When the bottles are placed on this rotating support, it serves to press and rub the tucks in the direction in which they are lapped, so the coated surfaces bearing the reheated adhesive are pressed tightly together and a complete closure at the bottom of the seal is accomplished, the bottle being of course in the meanwhile held tightly by the neck between the grippers and pressed against the rotating support. At the end of the dwell, the bottle is lifted and carried to station *k* and again lowered and released by the oscillation of the gripper cam 20 as already described.

When the bottle is lowered and released at station *k*, it is placed on the delivery belt 180, properly located to receive the bottle at this point. The delivery belt 180 is substantially horizontal and provided with side guides 181. This belt is passed over pulleys 182 and 183, the former driven by spiral gearing 184 from the vertical shaft 58 already described, the pulley 183 being in the present instance driven by a chain 185 and sprockets 186 from the shaft of the pulley 182.

In the operation of the machine, a pack of seals is placed in the magazine 65 with the openings turned to the right as seen in Fig. 1, and the tabs 94 down. The reciprocating vacuum grippers 67, which are timed to one reciprocation for each completed sealing operation, separate each seal in the pack in turn, bending it downward through the opening at the right end of the hopper. The grippers 70 on the chain 69 are brought each in turn in open position beneath the hopper, the opening of each gripper being accomplished by the hook 107. As both the hook 107 and the vacuum grippers are mounted on the oscillating shaft 66, they swing together with the result that the mechanical gripper is released and closed by operation of the spring 104 as the tab on the end of the seal is bent down within reach of the gripper jaws. In the machine illustrated, there are five sets of grippers on the chain 69 and the chain is driven intermittently through the star wheel 80 operated by the star wheel crank 79 on the one revolution shaft 77 (meaning one revolution for each completed sealing operation) which also carries the cam 76 which operates the rock shaft 66 oscillating the vacuum grippers and timing the closing of the mechanical grippers.

In this particular form of the machine, each step of the chain carries each gripper in turn from the position beneath the hopper, marked 70$^b$, to the position just over the bottle on the rest 61, marked 70$^a$, and it is in this latter position that the triangular openers 113 operate to balloon or open the seal. The next step of the chain draws the seal thus opened downward over the bottle at station *b*, see Fig. 3, and for the operation see Figs. 15, 16, 17, and at the end of the stroke brings the stud 102 on the gripper arm into contact with the cam 118, opening the gripper and releasing the seal.

We come next to the operation of the gripper head. As has already been described, the bottles are placed on the conveyer belt 55 which leads them into the grippers at a point where they preferably arrive open and are closed on the neck of each bottle as presented. The bottles are engaged one at a time by the grippers at station *a* and carried by the next step of the rotation of the gripper head to station *b* where they receive the seals fed from the hopper as already described, the gripper head being driven by the star wheel 8 which in turn is rotated by the Geneva crank 9 on the shaft 10 as already pointed out, providing a step by step motion for each complete operation.

The dwell or period between the steps of rotation of the gripper head extends through a considerable portion, probably two-thirds, of each revolution of the shaft 10, and this period is taken advantage of to lower the gripper head for the operations which take place at the various stations where the bottles being sealed dwell between the rotative steps of the head, and to raise it again before the gripper head starts to rotate, that is, the bottles are moved from station to station on a circular path in which they are out of range and out of contact with the various parts which act on the seals at the different stations and at each dwell they are lowered to bring the portion of the seal being operated upon into the necessary relation with the functioning means at each particular station.

As has been pointed out, the grippers are controlled by a cam 20 which moves up and down with the gripper head being keyed to the shaft 7 to slide thereon and rotate therewith and held in its relation to the gripper head by the keeper plate 120. This cam 20 is given a slight oscillatory movement during the dwell of the head, causing each gripper to open while at station $b$ to permit the seal to be drawn over the bottle and then causing it to close again at the end of the dwell to lift the bottle from the support and carry it along to the next station. The grippers are also opened a station $k$ to release the bottle and caused to arrive open at station $a$ where they are closed to engage each bottle as it is presented.

The grippers at station $b$ having been opened to permit the seal to be drawn over the bottle, and closed again upon the neck of the bottle and seal, the gripper head is raised causing the skirt to clear the support 61 and in the next rotative step, the bottle with the depending skirt is carried to station $c$ over the receptacle 121. As the gripper head drops, the dipper 123 which is normally beneath the liquid in the receptacle, is raised by the action of the disk 127 on the contact member 126 and the skirt enters the liquid in the receptacle as the dipper rises and the bottle descends. The head is next raised causing the dipper to drop and the bottle to rise lifting the skirt out of the liquid in the dipper. It is then carried successively to stations $e$, $f$ and $g$ and is at each station lowered and raised because other bottles are being treated where lowering of the bottle is necessary. At stations $e$, $f$ and $g$, in the present instance, nothing takes place but the partial drying of the adhesive. From station $g$ the bottle with the skirt still depending and coated with adhesive is moved over the tucking station, $h$, and lowered into operative relation with the tucking mechanism 135, see Fig. 5, the bottle being positioned on the arms 155. The slides 139, carrying each a gripper finger 140 are now thrust inward successively, preferably beginning with one of those opposite the positioning arms 155. As each of the slides moves inward, the tucker 140 engages the side of the bottle with the cam action already described, and rotates, swinging the folder finger 157 upward into contact with the skirt and pressing the segment of the skirt against the bottom of the bottle. As the fingers operate successively, each pressing a segment of the skirt against the bottle, the entire skirt is folded in with each fold at one edge extending slightly over the fold next previously made: When the tucking is thus completed, all the slides having their innermost position, the bottle is withdrawn by the raising of the gripper head and moved to the heating station where it is lowered into the heating cup or heater 165 and permitted to stay during the dwell. In this position it is raised and moved over the compressor 170, the rotation of the compressor causes the soft material thereon to rub over the folds of the skirt at the bottom of the seal, flattens these folds and presses them down, and causes the reheated sealing liquid to fasten the folds, completing the sealing operation. In this position, the bottles are raised and carried to a point over the delivery mechanism where they are lowered on to the delivery belt and carried out of the machine.

I have thus described my invention specifically and in detail in order that its nature and operation may be fully understood; however, the specific terms herein are used descriptively rather than in their limiting sense and the scope of the invention is defined in the claims:

1. In a machine for applying seals to bottles, a support for a bottle, means for maintaining a supply of seals, means for bringing the seals each into registration with a corresponding bottle on the support, means for opening the seals and drawing them downward over the bottles leaving a projecting skirt beneath each bottle and means for folding the skirts to complete the sealing operation, substantially as described.

2. In a machine for applying seals to bottles, means for maintaining a supply of seals, a bottle support, means for feeding the bottles to the support, means for bringing the seals each with the mouth downward and open into registration with the corresponding bottle on the support, means for drawing the seals downward over the bottles leaving a projecting skirt beneath each bottle, and folding means for folding the skirt to complete the closure.

3. In a machine for applying seals to bottles, means for maintaining a supply of seals, means for feeding bottles, means for bringing the seals into alinement with the corresponding bottles, means for opening the mouth of each seal and passing it over the corresponding bottle leaving a projecting skirt, and means for folding the skirt portion to complete the seal.

4. In a machine for covering bottles with seals in the form of bags open at one end, means for engaging the seals and drawing them over the bottles, leaving a projecting skirt, and means for folding and sealing the skirt.

5. In a machine for applying seals to bottles, means for moving the bottles step by step on a fixed path, means for maintaining a supply of seals, means engaging each seal individually, means for opening each seal and drawing it over a corresponding bottle during a dwell in the step by step motion, and means for closing the open end of the seal.

6. In a bottle sealing machine, means for engaging the bottles and moving them in a predetermined path with a step by step motion whereby the bottles are caused to dwell successively in a series of predetermined positions or stations, means causing each bottle to be disengaged and reëngaged at one station, means for maintaining a supply of seals, means for engaging and opening each seal successively and drawing it over the bottle which is temporarily disengaged at the said station for this purpose, leaving a projecting skirt beneath the bottle, and means at the other stations for folding and closing the skirt about the bottle.

7. In a bottle sealing machine, means for engaging the bottles and moving them in a predetermined path with a step by step motion whereby the bottles are caused to dwell successively in a series of predetermined positions or stations, means causing each bottle to be disengaged and reëngaged at one station, means for maintaining a supply of seals, means for engaging and opening each seal successively and drawing it over the bottle which is temporarily disengaged at the said station for this purpose, leaving a projecting skirt beneath the bottle, means for coating the skirt with adhesive, means for tucking the skirt, and means for pressing it in folded position at the successive stations.

8. In a machine for sealing bottles, means for moving the bottles with a step by step motion in a circular path, the dwells being at predetermined positions or stations, means for maintaining a supply of seals, means for opening the seals and drawing each seal over a corresponding bottle at one station, leaving a skirt projecting beyond the bottle, and means at the subsequent stations for closing the skirt.

9. In a machine for sealing bottles, means for moving the bottles with a step by step motion in a circular path, the dwells being at predetermined positions or stations, means for maintaining a supply of seals, means for opening the seals and drawing each seal over a corresponding bottle at one station, leaving a skirt projecting beyond the bottle, means at the subsequent stations for coating the skirt with adhesive, for tucking the skirt and pressing it in closed position respectively.

10. In a machine for sealing bottles, means for maintaining a supply of seals, means for engaging the bottles and moving them with a step by step motion in a circular path, the dwells being at predetermined positions or stations, means for causing the engaging means to release and reëngage the bottle at one said station, a support for the bottle while so disengaged, means for engaging the seals one at a time, means for opening them and drawing them each over the corresponding bottle on the support while it is disengaged, leaving a projecting skirt beyond the bottle, and means at the subsequent stations for folding and closing the skirt.

11. In a machine for sealing bottles, means for maintaining a supply of seals, means for engaging the bottles and moving them with a step by step motion in a circular path, the dwells being at predetermined positions or stations, means for causing the engaging means to release and reëngage the bottle at one said station, a support for the bottle while so disengaged, means for engaging the seals one at a time, means for opening them and drawing them each over the corresponding bottle on the support while it is disengaged, leaving a projecting skirt beyond the bottle, and means at the subsequent stations for coating the skirt with adhesive, tucking it and pressing it in folded position.

12. In a machine for sealing bottles, means for maintaining a supply of seals, means for engaging the bottles and moving them with a step by step motion in a circular path, the dwells being at predetermined positions or stations, means for causing the engaging means to release and reëgage the bottle at one said station, a support for the bottle while so disengaged, means for engaging the seals one at a time, means for opening them and drawing them each over the corresponding bottle on the support while it is disengaged, leaving a projecting skirt beyond the bottle, and means at the subsequent stations for coating the skirt with adhesive, tucking it, heating and pressing it in folded position.

13. In a machine for sealing bottles, means for maintaining a supply of seals, means for engaging the bottles and moving them with a step by step motion in a circular path, the dwells being at predetermined points or stations, means for moving them down and up during some of the dwells in the rotary motion, means for supporting the bottles at one station, means for causing the engaging means to release the bottle at its lowest position leaving it on the support and to reëngage it at the end of the dwell lifting it from the support, means for engaging the seals one at a time, opening them, and drawing each seal over the corresponding bottle while disengaged on the said support, leaving a skirt projecting beyond the bottle, and means at the subsequent stations for folding and closing the skirt.

14. In a machine for applying seals to bottles, a rotary gripper head with means for giving the same a step by step rotation and means for moving it down and up between rotations, means for opening and closing the grippers at one station or point of dwell when the head is in its lowermost position, a support for the bottle during the period the grippers are open, and means for drawing the seal over the bottle during the period while it is thus released and supported.

15. In a machine for sealing bottles, a gripper head, a hollow shaft on which the gripper head is mounted, a second shaft within the hollow shaft, a cam keyed to the internal shaft, a set of grippers carried by the gripper head and having a follower engaging the cam, means for imparting a step by step rotation to the hollow shaft and means for oscillating the inner shaft to open and close the grippers by moving the cam while the gripper head is stationary.

16. In a machine for sealing bottles, a gripper head, a hollow shaft on which the gripper head is mounted, a second shaft within the hollow shaft, a cam keyed to the internal shaft, a set of grippers carried by the gripper head and having a follower engaging the cam, means for imparting a step by step rotation to the hollow shaft, means for oscillating the inner shaft to open and close the grippers by moving the cam while the gripper head is stationary, and means for moving the hollow shaft and the gripper head up and down carrying the cam with the gripper head in the intervals between the rotative steps of the gripper head.

17. In a machine for sealing bottles, a tucking mechanism for a depending skirt, consisting of a plurality of radiating, sliding members with a folder finger on the inner end of each said members, each folder finger having a vertical member with a curved portion to engage the cylindrical portion of the bottle and a triangular horizontal member to engage the bottom of the bottle, and means for moving the sliding members in and out radially.

18. In a machine for covering bottles with seals in the form of bags open at one end, means for engaging the seals and drawing them over the bottles and means for closing the open end.

19. In a bottle sealing machine, means for engaging the bottles and moving them in a predetermined path with a step by step motion whereby the bottles are caused to dwell successively in a series of predetermined positions or stations, means for maintaining a supply of seals, means for drawing each seal successively over a bottle at one of the stations leaving a projecting skirt beneath the bottle, means for tucking the skirt, and rotary means for pressing it in folded position.

Signed by me at Baltimore, Maryland, this 15 day of January, 1917.

ALFRED H. BRAECKLEIN.

Witnesses:
ZELLA KUHN,
EDWIN R. SAMUELS.